(No Model.)
A. C. HENDRICKS.
Fertilizer Attachment for Seed Drill.
No. 230,278. Patented July 20, 1880.
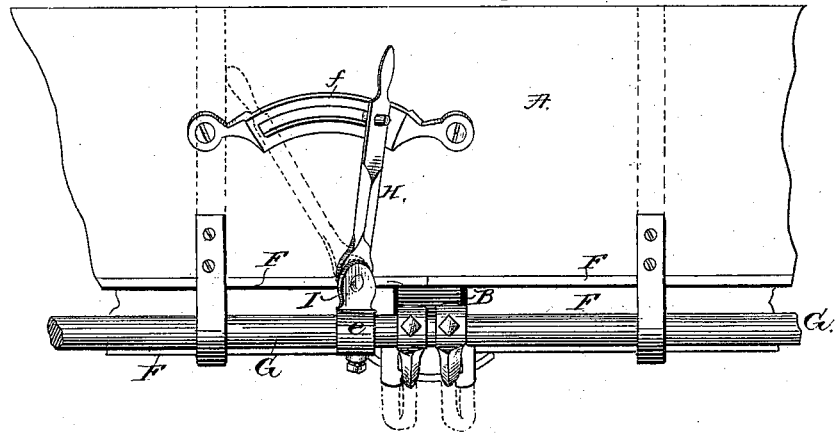
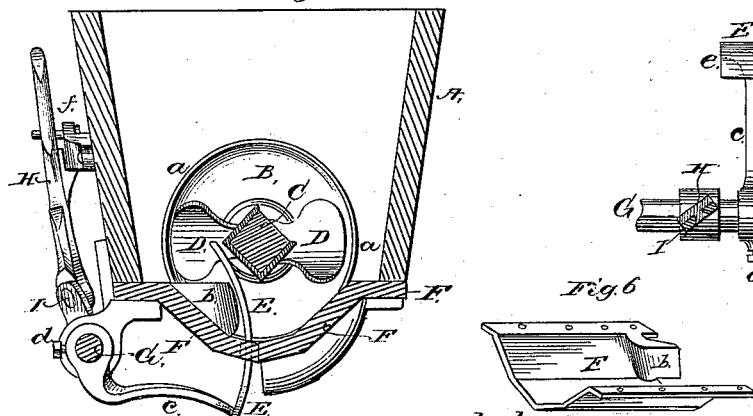
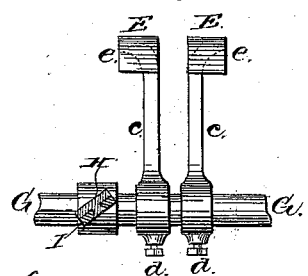
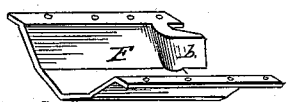
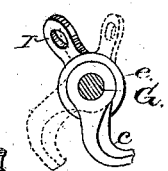
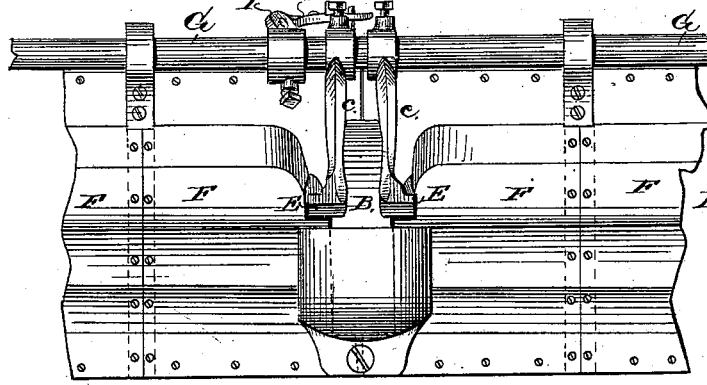
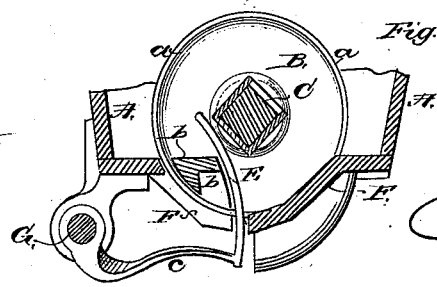
WITNESSES:
INVENTOR:
A. C. Hendricks
BY
ATTORNEYS.

United States Patent Office.

ADAM C. HENDRICKS, OF DUFFIELD STATION, WEST VIRGINIA.

FERTILIZER ATTACHMENT FOR SEED-DRILLS.

SPECIFICATION forming part of Letters Patent No. 230,278, dated July 20, 1880.

Application filed April 28, 1880. (No model.)

*To all whom it may concern:*

Be it known that I, ADAM C. HENDRICKS, of Duffield Station, in the county of Jefferson and State of West Virginia, have invented a new and useful Improvement in Fertilizer Attachments for Seed-Drills; and I do hereby declare that the following is a full, clear, and exact description of the same.

This invention is an improvement upon the fertilizer distributer or attachment for feed-drills for which Letters Patent of the United States No. 224,184 were granted to me on February 3, 1880.

The improvement relates to the construction of a hand-lever and the attachment of it and the gates for controlling the discharge of seed to a shaft which is arranged parallel to the side of the hopper, as hereinafter described.

In the accompanying drawings, forming part of this specification, Figure 1 is a side view of a portion of the hopper of a planter or seeding-machine having my improvements attached. Fig. 2 is a vertical transverse section of the same. Fig. 3 is a plan view of the bottom of the hopper and its attachments. Figs. 4 and 5 are detail cross-sections. Fig. 6 is a perspective view of one of the sections of the hopper-bottom detached. Fig. 7 is a detail section of the rock-shaft for adjusting the gates that regulate discharge of fertilizer.

The seed-hopper A has a number of compartments, in each of which is placed a feed-wheel, B, fixed on a rotating shaft, C, that traverses the hopper from end to end. The said wheel has lateral peripheral flanges $a$, and is arranged vertically in a transverse slot in the hopper-bottom, so that its lower side is flush with the inner surface of the latter.

The shaft C is provided with arms or paddles D, which agitate the fertilizer, and are so placed as to move it toward the feed-wheel. As the wheel B revolves with said shaft, the portion of the fertilizer resting on the flanges $a$ of the rim will be carried round with them until scraped off by contact with the abutments $b\ b$, when it will fall into a spout (not shown) and be conveyed into the furrow.

Gates E are employed for the purpose of gaging the quantity of fertilizer discharged.

I have thus far described those machines which are found in that covered by my aforesaid patent.

The hopper-bottom is constructed in sections formed of cast-metal plates F F, which are attached by means of screws and cut out at one end to allow space for the feed-wheel B.

I will now indicate my improvements: Each gate E has an arm, $c$, through the eye of which the shaft G passes, the parts being secured by clamp-screws $d$, so as to admit of the required adjustment of the gates relative to the feed-wheel D and abutments $b$, in order to take up wear or vary the size of the opening through which the fertilizer is allowed to discharge. The shaft G is arranged parallel to the side of the hopper A, and is rocked by means of the arm or hand-lever H, for the purpose of opening or closing the gates E E.

In my former invention the lever employed for this purpose was attached to the shaft at the end of the hopper, and was adapted for adjustment radially thereto; but it is desirable to attach it to the middle portion of the shaft, and to make it adjustable in a plane parallel to the shaft and to the side of the hopper, so that it may be more conveniently accessible and require as small space as practicable. These objects I have attained by pivoting the lower end of the lever H to a flat lug, I, that projects radially from a sleeve, $e$, secured to the shaft G, but which lug is arranged diagonally to the axis of the latter. Thus when the lever H is thrown to the right or left, its upper end being forced by connection with guide $f$ to move in a plane parallel to the side of the hopper A, the effect is to shift the lug I, and thereby turn or rock the shaft G, as illustrated by dotted lines, Figs. 1 and 7.

I do not claim, broadly, the arrangement of a hand-lever parallel to the side of a hopper in connection with a shaft which regulates the position of valves or gates for governing the discharge of fertilizer or seed.

Having thus described my invention, what I claim as new is—

The combination, with the hopper and the shaft G, arranged parallel to its side, of the radial lug I, attached to said shaft and arranged diagonally, and the hand-lever H, pivoted to the flat side of said lug, and a guide fixed on the side of the hopper, all as shown and described, whereby the shifting of the free end of the lever in the direction of the length of the shaft causes rotation of the latter, as specified.

The above specification of my invention signed by me this 22d day of April, 1880.

A. C. HENDRICKS.

Witnesses:
SOLON C. KEMON,
CHAS. A. PETTIT.